Patented July 10, 1951

2,559,807

UNITED STATES PATENT OFFICE 2,559,807

DYESTUFF PREPARATIONS

Arthur Topham, Blackley, Manchester, England, assignor to Imperial Chemical Industries Limited, a corporation of Great Britain No Drawing. Application January 27, 1949, Serial No. 73,235. In Great Britain January 26, 1948

8 Claims. (Cl. 8—35)

This invention relates to dyestuff preparations and more particularly it relates to dyestuff preparations containing leuco sulphuric ester derivatives of vat dyestuffs for use in the printing of textile materials.

According to my invention I provide new dyestuff preparations for use in the printing of textile materials which comprise a leuco sulphuric ester derivative of a vat dyestuff and an organic compound containing a sulphonic acid and an amidine, or substituted amidine, group.

The organic compounds used in the new dyestuff preparations have a solubilising or dispersing action on the leuco sulphuric esters.

As suitable organic compounds for use in the invention there may be mentioned benzamidine-m-sulphonic acid which may be obtained by the sulphonation of benzamidine hydrochloride, and 2-phenyl-iminazoline-m-sulphonic acid which may be obtained by the sulphonation of 2-phenyliminazoline.

The leuco sulphuric ester derivative of a vat dyestuff used in the invention may be a derivative of a vat dyestuff of the anthraquinone, indigo or thioindigo series and it may be added to the dyestuff preparation in the form of a salt, for example the sodium salt.

If required urea may also be added to the dyestuff preparation.

The present invention is directed especially to the use of those leuco sulphuric ester derivatives which give sparingly soluble alkali metal or ammonium salts and which accordingly give weak and dull prints when used for printing textile fabrics by the conventional methods.

The new dyestuff preparations of my invention when made up into printing pastes by known methods give much brighter and stronger prints than those obtainable from the sparingly soluble leuco sulphuric ester derivative of the vat dyestuff in the absence of the organic compound as hereinbefore defined.

The invention is illustrated but not limited by the following examples in which the parts are by weight.

Example 1

10 parts of a dyestuff paste containing 25% of the sodium salt of the acid sulphuric ester of leuco-dibromanthanthrone,
10 parts of urea and
5 parts of benzamidine-m-sulphonic acid are dissolved in
12 parts of water. The solution is added to
60 parts of starch tragacanth thickening and
3 parts of a 30% sodium nitrite solution are then added.

100 parts

The paste so obtained is printed onto cotton fabric. The fabric is dried and the print is developed by padding the fabric through 2% sulphuric acid solution at 70° C. then rinsing and soaping at the boil. A very bright, level and strong orange print is obtained.

In the above example the benzamidine-m-sulphonic acid may be replaced with substantially the same result by 2-phenyl-iminazoline-m-sulphonic acid or by N-methylbenzamidine sulphonic acid (which may be prepared by the sulphonation of N-methylbenzamidine hydrochloride) or by N:N'-dimethylbenzamidine sulphonic acid (which may be prepared by the sulphonation of N:N'-dimethylbenzamidine hydrochloride).

Example 2

10 parts of a dyestuff paste containing 25% of the sodium salt of the acid sulphuric ester of leuco-dibromanthanthrone
10 parts of urea and
5 parts of benzamidine-m-sulphonic acid are dissolved in
7 parts of water. The solution is added to
60 parts of starch tragacanth thickening previously neutralised with ammonia.
2 parts of a 50% ammonium thiocyanate solution,
4 parts of a 10% sodium chlorate solution and
2 parts of a 1% ammonium vanadate solution are then added.

100 parts

The paste so obtained is printed onto cotton fabric. The fabric is then dried and the print is developed by steaming during 10 minutes, rinsing in water and soaping at the boil. A very bright, level and strong orange print is obtained.

In the above example the benzamidine-m-sulphonic acid may be replaced by 2-phenyliminazoline-m-sulphonic acid with substantially the same result.

I claim:

1. Dyestuff preparations for use in the printing of textile materials comprising a leuco sulphuric ester derivative of a vat dyestuff and a sulphonated benzamidine of the general formula RX wherein R is a sulphonated monocyclic aromatic hydrocarbon radical and X is a radical selected from the group consisting of

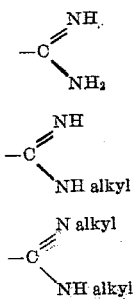

and

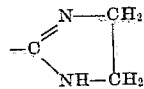

2. Dyestuff preparations for use in the printing of textile materials comprising a leuco sulphuric ester derivative of a vat dyestuff and benzamidine-m-sulphonic acid.

3. Dyestuff preparations for use in the printing of textile materials comprising a leuco sulphuric ester derivative of a vat dyestuff and N-methylbenzamidine sulphonic acid.

4. Dyestuff preparations for use in the printing of textile materials comprising a leuco sulphuric ester derivative of a vat dyestuff and N:N'-dimethylbenzamidine sulphonic acid.

5. Dyestuff preparations for use in the printing of textile materials comprising a leuco sulphuric ester derivative of a vat dyestuff, urea, and a sulphonated benzamidine of the general formula RX wherein R is a sulphonated monocyclic aromatic hydrocarbon radical and X is a radical selected from the group consisting of

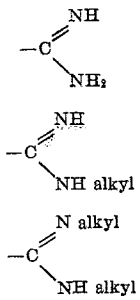

and

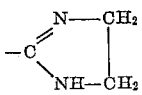

6. Dyestuff preparations for use in the printing of textile materials comprising a leuco sulphuric ester derivative of a vat dyestuff and 2-phenyliminazoline-m-sulphonic acid.

7. Dyestuff preparations as claimed in claim 1 wherein said leuco sulphuric ester derivative is in the form of a sparingly soluble alkali metal salt.

8. Dyestuff preparations as claimed in claim 1 wherein said leuco sulphuric ester derivative is in the form of a sparingly soluble ammonium salt.

ARTHUR TOPHAM.

REFERENCES CITED

The following references are of record in the file of this patent:

FOREIGN PATENTS

| Number | Country | Date |
|---|---|---|
| 644,904 | Great Britain | Oct. 18, 1950 |
| 235,027 | Switzerland | Mar. 1, 1945 |